P. J. Hogan,
Saw.
No. 102,400.    Patented Apr. 26, 1870.
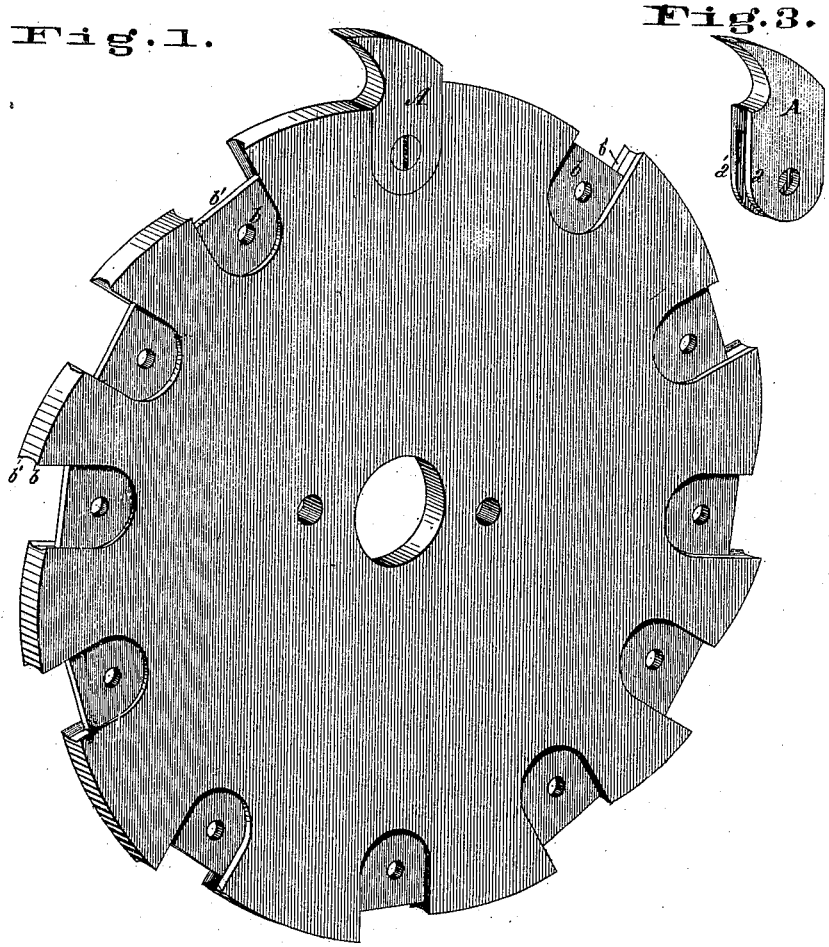

United States Patent Office.

PATRICK J. HOGAN, OF CINCINNATI, OHIO.

Letters Patent No. 102,400, dated April 26, 1870.

IMPROVEMENT IN DETACHABLE SAW-TEETH.

The Schedule referred to in these Letters Patent and making part of the same.

To all whom it may concern:

Be it known that I, PATRICK J. HOGAN, of Cincinnati, Hamilton county, State of Ohio, have invented a certain new and useful Improvement in Movable Saw-Teeth; and I do hereby declare the following to to be a sufficiently full, clear, and exact description thereof to enable one skilled in the art to which my invention appertains to make and use it, reference being had to the accompanying drawings making part of this specification.

My invention consists in a new and peculiar construction of movable teeth and recesses for receiving the same in the body of the saw.

In the accompanying drawings—

Figure 1 is a perspective view of a circular-saw body with one of the teeth in place.

Figure 2 is a section through the body and tooth, showing the method of fastening.

Figure 3 is a perspective view of a tooth detached.

The tooth A is constructed with jaws $a$ $a'$ which are perforated, as shown, for the necessary rivet or screw fastening.

The jaws $a$ $a'$ have rounded ends, and are fitted into the recesses $b$ $b'$ in the body of the saw. The recesses $b$ $b'$ are necessarily semicircular on the inner ends, as they are formed by a revolving cutter, and are also dovetailed to fit the dovetail sides of the jaws $a$ $a'$.

The tooth A is of the same thickness as the saw, the exterior faces of the jaws $a$ $a'$ being, when in place, flush with the face of the saw. The metal between the recesses $b$ $b'$ is cut away below the periphery of the body of the saw, in order that the tooth may have its full thickness and strength on the periphery of the body of the saw. The tooth may either be riveted through the perforations of the jaws, or be secured in place by screw and nut, countersunk, as shown in fig. 2.

The recesses in the saw may be cut radially, as shown, or tangentially.

I claim herein as new and of my invention—

The movable tooth A, provided with jaws $a$ $a'$, in combination with the semicircular-ended side recesses $b$ $b'$ of the saw-body, constructed substantially in the manner and for the purpose specified.

In testimony of which invention I hereunto set my hand.

PATRICK J. HOGAN.

Witnesses:
    FRANK MILLWARD,
    J. L. WARTMANN.